United States Patent
Roger et al.

(10) Patent No.: US 9,638,789 B2
(45) Date of Patent: May 2, 2017

(54) METHOD, DEVICE AND SYSTEM FOR PROCESSING RADAR SIGNALS

(71) Applicant: Infineon Technologies AG, Neubiberg (DE)

(72) Inventors: André Roger, Munich (DE); Romain Ygnace, Munich (DE)

(73) Assignee: Infineon Technologies AG, Neubiberg (DE)

( * ) Notice: Subject to any disclaimer, the term of this patent is extended or adjusted under 35 U.S.C. 154(b) by 329 days.

(21) Appl. No.: 14/168,075

(22) Filed: Jan. 30, 2014

(65) Prior Publication Data

US 2015/0212196 A1    Jul. 30, 2015

(51) Int. Cl.

| | |
|---|---|
| *G01S 13/93* | (2006.01) |
| *G01S 7/295* | (2006.01) |
| *G06F 7/523* | (2006.01) |
| *G06F 17/14* | (2006.01) |
| *G01S 7/292* | (2006.01) |
| *G01S 7/40* | (2006.01) |
| *G01S 13/28* | (2006.01) |
| *G01S 13/32* | (2006.01) |
| *G01S 7/35* | (2006.01) |
| *G01S 7/288* | (2006.01) |

(52) U.S. Cl.
CPC ............ *G01S 7/295* (2013.01); *G01S 7/2928* (2013.01); *G01S 7/354* (2013.01); *G01S 7/4021* (2013.01); *G01S 13/288* (2013.01); *G01S 13/325* (2013.01); *G01S 13/931* (2013.01); *G06F 7/523* (2013.01); *G06F 17/142* (2013.01); *G01S 2007/2883* (2013.01); *G01S 2007/356* (2013.01); *G01S 2013/9321* (2013.01); *G01S 2013/9325* (2013.01); *G01S 2013/9332* (2013.01)

(58) Field of Classification Search
CPC ............................. G01S 13/288; G01S 7/2928
USPC .......................................................... 342/196
See application file for complete search history.

(56) References Cited

U.S. PATENT DOCUMENTS

| | | | | |
|---|---|---|---|---|
| 4,006,351 | A * | 2/1977 | Constant ................. | G01S 7/292 708/314 |
| 7,336,218 | B2 | 2/2008 | Nishimura et al. | |
| 7,986,615 | B2 | 7/2011 | Kawauchi et al. | |
| 2009/0085800 | A1 | 4/2009 | Alland et al. | |
| 2010/0090898 | A1* | 4/2010 | Gallagher ................ | H01Q 3/26 342/373 |

FOREIGN PATENT DOCUMENTS

| | | |
|---|---|---|
| CN | 102121991 A | 7/2011 |
| JP | S59-010025 A | 7/1982 |
| JP | S62-173482 A | 1/1986 |
| JP | S62-179673 A | 2/1986 |

(Continued)

*Primary Examiner* — Peter Bythrow
*Assistant Examiner* — Helena Seraydaryan
(74) *Attorney, Agent, or Firm* — Eschweiler & Potashnik, LLC

(57) ABSTRACT

An embodiment relates to a method for processing input data that includes multiplying a portion of the input data with a first set of coefficients or with a second set of coefficients, wherein the first set of coefficients and the second set of coefficients are stored in a memory, wherein the first set of coefficients is used on phase modulated input data and wherein the second set of coefficients is used on input data that are not phase modulated.

17 Claims, 2 Drawing Sheets

(56) References Cited

FOREIGN PATENT DOCUMENTS

| | | |
|---|---|---|
| JP | S63-247682 A | 4/1987 |
| JP | H02264647 A | 10/1990 |
| JP | H06-291792 A | 3/1993 |
| JP | H06-331735 A | 3/1994 |
| JP | H09-293193 A | 4/1996 |
| JP | H10-148670 A | 9/1997 |
| JP | H11-160421 A | 11/1997 |
| JP | 2001-051049 A | 8/1999 |
| JP | 2000196687 A | 7/2000 |
| JP | 2004180062 A | 6/2004 |
| JP | 2004518141 A | 6/2004 |
| JP | 2008003078 A | 1/2008 |
| JP | 2008134147 A | 6/2008 |
| JP | 2008241319 A | 10/2008 |
| JP | 2009244136 A | 10/2009 |
| JP | 2011-039033 A | 5/2010 |
| JP | 2012522449 A | 9/2012 |
| WO | 2005109033 A1 | 11/2005 |

\* cited by examiner

METHOD, DEVICE AND SYSTEM FOR PROCESSING RADAR SIGNALS

FIELD

Embodiments of the present disclosure relate to radar applications, in particular, an efficient way to process radar signals obtained by at least one radar sensor, e.g., via at least one antenna. Processing radar signals in this regard in particular refers to radar signals received by a sensor or an antenna.

BACKGROUND

Several radar variants are used in cars for various application scenarios. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e., a signal distributed across a frequency range. The amplitude of the signal may indicate an amount of echo, wherein a peak may represent a target that needs to be detected and used for further processing, e.g., adjust the speed of the car based on another car travelling in front.

SUMMARY

A first embodiment relates to a method for processing input data, the method comprising multiplying a portion of the input data with a first set of coefficients or with a second set of coefficients, wherein the first set of coefficients and the second set of coefficients are stored in a memory. According to the method the first set of coefficients is used on phase modulated input data and the second set of coefficients is used on input data that are not phase modulated.

A second embodiment relates to a device for processing radar signals comprising a processing unit and a memory, wherein the processing unit is configured to multiply a portion of input data with a first set of coefficients or with a second set of coefficients, wherein the first set of coefficients and the second set of coefficients are stored in the memory. According to the device the first set of coefficients is used on phase modulated input data and the second set of coefficients is used on input data that are not phase modulated.

A third embodiment relates to a radar transceiver module comprising the device as described herein.

A fourth embodiment is directed to a system for processing radar signals comprising a means for multiplying a portion of input data with a first set of coefficients or with a second set of coefficients, wherein the first set of coefficients and the second set of coefficients are stored in a memory. According to the system the first set of coefficients is used on phase modulated input data and the second set of coefficients is used on input data that are not phase modulated.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
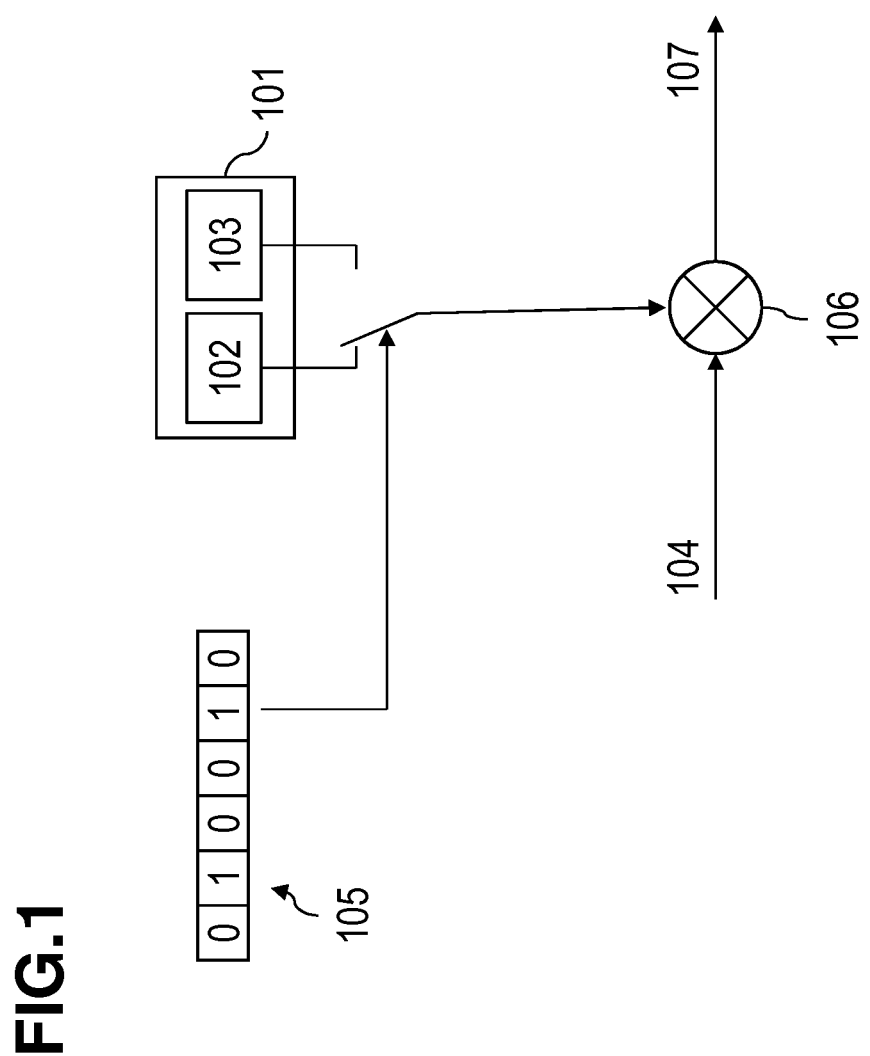
FIG. 1 shows a schematic diagram for selecting one of two window arrays based on a predefined pattern.

A radar device may emit a phase modulated signal which when received needs to be demodulated. This bears the advantage that, based on different phase modulations, different signals could be processed, which improves the reception quality or capability of a radar device.

According to an example, a phase modulation in a radar environment is supported. The phase modulation may be used to apply a phase shift to a signal before emitting the signal. Accordingly, a phase demodulation corresponds to the reverse process when a signal is being received.

Based on a signal s(t), the phase-shifted signal corresponds to $$s(t)e^{i\phi},$$

with $\phi$ being the phase shift. If the phase shift $\phi$ amounts to 180°, the following applies:

$$s(t)e^{i\phi}=-s(t).$$

Based on an arbitrary phase shift $\phi$, the following applies:

$$s(t)e^{i\phi}=s(t)(\cos\phi+i\sin\phi).$$

In an integrated solution, e.g., utilizing a signaling processing unit (SPU), a single module may provide complex windowing. A Fast-Fourier-Transform (FFT) may be set to a predefined length before being executed. This length (also referred to as a size of the FFT) determines a number of input data (e.g., samples) provided to the FFT. For example, a "512-FFT" processes 512 samples of input data. The FFT may be implemented as a FFT stage of the module.

In radar applications, a signal is in one embodiment windowed prior to the FFT being conducted. Windowing may in this regard comprise any processing of a particular portion of data, which are supplied over a pre-defined time period. For example, data can be successively processed in separate portions (windows). Such a separation into a pre-defined number of input data (that may be associated with a particular time period) may thus be conducted prior to the FFT.

According to an example, a phase (de-)modulation may be associated with such processing. Prior to the FFT processing, the window may be determined and a set of coefficients may be determined to be multiplied with the input data.

For example, 512 input data may be conveyed to the FFT. In this case, the window size may correspond to such a set of 512 input data (i.e., the size of the window amounts to 512 input data).

Each of the input data $A_i$ is multiplied with a coefficient $W_i$. The set of coefficients $W_i$ can also be referred to as window array $$[W_0\ W_1\ W_2\ \ldots\ W_{N1}]$$

and the input data of the size of the window can be denoted as $$[A_0 \, A_1 \, A_2 \ldots A_N].$$

The set of coefficients can be pre-determined and stored. After multiplication the input array for the FFT processing stage is $$[W_0 A_0 \, W_1 A_1 \, W_2 A_2 \ldots W_N A_N].$$

The coefficients $W_i$ and the input data $A_i$ can each be complex or real values.

Accordingly, a phase demodulation array can be defined as follows $$[P_0 \, P_1 \, P_2 \ldots P_N],$$

wherein each phase demodulation coefficient $P_i$ indicates a phase demodulation for the respective sample of the input data $A_i$.

Hence, the phase-demodulated signal array is $$[P_0 A_0 \, P_1 A_1 \, P_2 A_2 \ldots P_N A_N].$$

and the demodulated windowed signal array fed to the FFT-stage equals $$[W_0 P_0 A_0 \, W_1 P_1 A_1 \, W_2 P_2 A_2 \ldots W_N P_N A_N].$$

As phase (de-)modulation and windowing are known prior to signal processing, the demodulated window array is $$[W_0 P_0 \, W_1 P_1 \, W_2 P_2 \ldots W_N P_N]$$

and can be stored as demodulated window coefficients $W'_i$ (also referred to as a demodulated window array)

$$[W'_0 \, W'_1 \, W'_2 \ldots W'_N]$$

in a memory.

The phase demodulation can be applied every n-th FFT, wherein n may be any positive integer or 0. For example, the phase demodulation can be applied every second FFT, hence the window coefficient $W_i$ and the demodulated window coefficients $W'_i$ are alternately applied.

According to an example, a memory (also referred to as a buffer) may be used having twice the size of the input signals to be stored for the FFT stage. For example, the memory may store the coefficients of the window array without phase demodulation and the coefficient of the window array with phase demodulation, i.e.

$$[W_0 \, W_1 \, W_2 \ldots W_N] \text{ and}$$

$$[W_0 \, W_1 \, W_2 \ldots W_N].$$

Both arrays will be used on the input data dependent on a predetermined scheme or dependent on whether the input data was phase modulated or not. The arrays may be repeatedly used on the input data, wherein each array size corresponds to the number of samples that are to be processed in the subsequent FFT stage. For example, if the FFT stage is capable of processing 512 samples, each of the arrays may provide 512 coefficients.

FIG. 1 shows a schematic diagram for selecting one of two window arrays based on a predefined pattern 105. A memory 101 comprises
  a window array 102, i.e. the window array comprising coefficients without phase modulation, i.e. $[W_0 \, W_1 \, W_2 \ldots W_N]$ and
  a window array 103, i.e. the window array comprising coefficients also considering phase modulation, i.e., $[W_0 \, W_1 \, W_2 \ldots W_N]$ Input data 104 are multiplied by a multiplication unit 106 with either the window array 102 or the window array 103. The window array 102 is to be used in case the input data 104 are not phase modulated and the window array 103 is to be used in case the input data 104 were phase modulated.

The predefined pattern 105, which may be stored in, e.g., a shift register, is used to select either the window array 102 (if the value stored in the shift register is "0") or the window array 103 (if the value stored in the shift register is "1") to process a portion of the input data 104 that corresponds to the size of the window. After each selection of the window array 102 or 103, the next value in the shift register is used for the subsequent selection, i.e., the next portion (i.e., window) of input data 104. An output 107 of the multiplication unit 106 is fed to a FFT-stage (not shown).

However, this is merely an example scenario. As an alternative, other sorts or memory can be used to provide the predefined pattern 105 to either select the window array 102 or the window array 103. Also, the value "0" can be used to select the window array 103 and the value "1" can be used to select the window array 102. The predefined pattern 105 may be supplied by a separate control unit or by the component conducting the processing of the input data 104.

Figure 2:
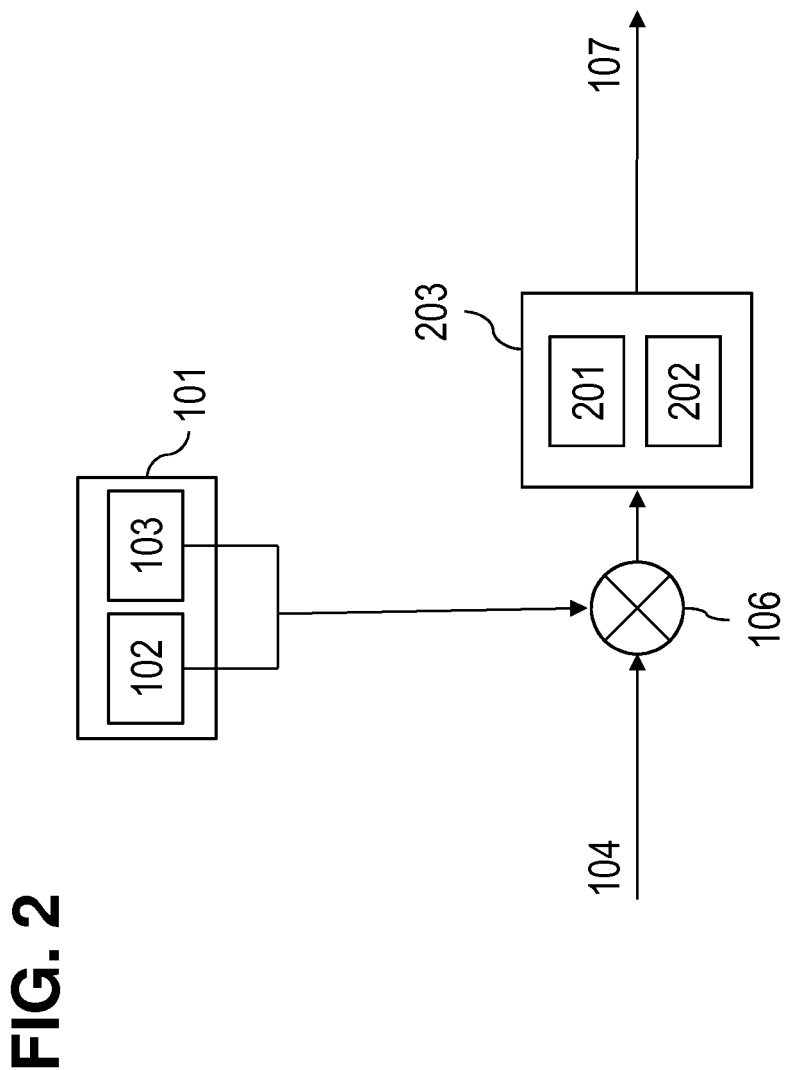
FIG. 2 shows an alternative solution for an efficient demodulation of the input data.

FIG. 2 shows an alternative solution for an efficient demodulation of the input data 104. The memory 101 comprises the window arrays 102 and 103. The input data 104 is multiplied with each window array 102 and 103, i.e., for a predetermined size of input data 104 (e.g., number of samples),
  a multiplication with the window array 102 is conducted and the results are stored in a memory 201; and
  a multiplication with the window array 103 is conducted and the result are stored in a memory 202.

The memory 201 and the memory 202 may be part of a processing unit 203, which determines based on the data stored in the memory 201 and 202, which of the multiplications was correct, i.e., whether the input data 104 processed were phase modulated or not.

For example, such an automated decision can be based on comparing a noise level in each of the multiplications. For example, the data stored in one of the memories 201 and 202 can be chosen for further processing which has a minor noise level compared to the data stored in the respective other memory. Also, a signal-to-noise ratio could be used to decide which of the multiplications to select.

The processing unit 203 may advantageously only store and process data twice of the size of the window, compare the results and select the result which shows the better signal quality. This result is then conveyed for further processing to the FFT stage via the output 107.

The examples suggested herein may in particular be based on at least one of the following solutions. In particular, combinations of the following features could be utilized in order to reach a desired result. The features of the method could be combined with any feature(s) of the device, apparatus or system or vice versa.

A method is provided for processing input data, the method comprising multiplying a portion of the input data with a first set of coefficients or with a second set of coefficients, wherein the first set of coefficients and the second set of coefficients are stored in a memory. According to the method the first set of coefficients is used on phase modulated input data and the second set of coefficients is used on input data that are not phase modulated.

The first set of coefficients and the second set of coefficients may, in particular, refer to the same window size. This window size may also be used for processing the input data, i.e., the input data may be processed in subsequent portions of this window size. For each such window, either the first set of coefficients or the second set of coefficients is used for the multiplication.

By storing the first set of coefficients and the second set of coefficients in the memory, a fast and flexible processing of input data can be achieved prior to a FFT stage. The memory in one embodiment may be one physical structure (i.e., the same memory) for providing the first and second set of coefficients.

The solution may thus advantageously provide an accelerated FFT processing by supplying a split memory comprising coefficients used for phase demodulation and coefficients used on data without phase modulation.

The input data may be samples of a radar signal obtained and digitized by a receiver.

In an embodiment, the first set of coefficients and the second set of coefficients are determined in advance and stored in the memory prior to the method for processing input data being started.

In an embodiment, the first set of coefficients comprises weighting coefficients multiplied with phase demodulation coefficients for a predetermined number of input data.

In an embodiment, the second set of coefficients comprises weighting coefficients for a predetermined number of input data.

In an embodiment, the input data comprise data samples received by a radar antenna.

In an embodiment, the method comprises forwarding the result of the multiplication of a portion of the input data with either the first set of coefficients or the second set of coefficients to a FFT processing stage.

In an embodiment, the input data are processed by portions of a predetermined size and the method comprises multiplying each portion of the predetermined size of the input data either with the first set of coefficients or with the second set of coefficients based on a predefined pattern.

The portion of the predetermined size is also referred to as window. The portion of the predetermined size may be the same size as the first set of coefficients and the second set of coefficients. The set may also be referred to as an array. Also, this predetermined size may correspond to the size of samples the FFT processing stage is capable of processing.

The input data may have been phase modulated or not. This applies for the samples of the predetermined window size. Hence, a first set of input data may have been phase modulated, a second set may not have been phase modulated, a third set may also not have been phase modulated and a fourth set may have been phase modulated. Each set has the size of the window. At the receiver, the decision is to be made on a window-by-window basis whether the input data (received) was phase modulated or not. If the input data was phase modulated, a reverse process needs to be triggered, i.e. phase demodulation is required.

In an embodiment, the predefined pattern is provided via a register, in particular a shift register.

In an embodiment, the input data are processed by portions of a predetermined size and the method comprises multiplying each portion of the predetermined size of the input data with the first set of coefficients, and multiplying each portion of the predetermined size of the input data with the second set of coefficients. The method further comprises determining whether the first set of coefficients or the second set of coefficients provides the better results of the multiplication, and forwarding the result of the multiplication which provided better results to a FFT processing stage.

Hence, per window, a (first) multiplication is conducted for the window of the input data with the first set of coefficients and a (second) multiplication is conducted for this window of the input data with the second set of coefficients. The results of the first and the second multiplication may be compared with each other. As the window of input data was either phase modulated or not, one of the multiplications provides better results than the other. Based on the quality of the results, it can be automatically determined, which multiplication results to be used for further processing (in the FFT processing stage). The multiplication which provided worse results may be discarded in one embodiment.

In an embodiment, the method comprises determining whether the first set of coefficients or the second set of coefficients provides a better result based on a noise level.

The multiplication results can, in particular, be compared based on the noise level. For example, a signal-to-noise ratio or the like may be used to determine which of the multiplications was correct.

A device for processing radar signals is provided, the device comprising a processing unit and a memory. The processing unit is configured to multiply a portion of input data with a first set of coefficients or with a second set of coefficients, wherein the first set of coefficients and the second set of coefficients are stored in the memory. According to the device the first set of coefficients is used on phase modulated input data and the second set of coefficients is used on input data that are not phase modulated.

In an embodiment, the device further comprises a FFT processing stage for further processing the results of the multiplication.

In an embodiment, the memory, the processing unit and the FFT processing stage are integrated on a single substrate, in particular a semiconductor, a die or a chip.

In an embodiment, the processing unit is configured to multiply each portion of the predetermined size of the input data either with the first set of coefficients or with the second set of coefficients based on a predefined pattern.

The device may be used as an accelerator for an FFT processing stage or it may comprise the FFT processing stage. The predefined pattern may be supplied by external hardware and/or by external software. The portion of the predetermined size of input data may correspond to a ramp of emitted radar signals, wherein each ramp comprises a succession of frequency signals of increasing frequencies emitted by a sender.

In an embodiment, the processing unit is configured to multiply each portion of the predetermined size of the input data with the first set of coefficients, and multiply each portion of the predetermined size of the input data with the second set of coefficients. The processing unit is further configured to determine whether the first set of coefficients or the second set of coefficients provides the better results of the multiplication, and forward the result of the multiplication which provided better results to a FFT processing stage.

Also, a radar transceiver module is disclosed comprising at least one device as described herein.

A system for processing radar signals is disclosed, the system comprising means for multiplying a portion of input data with a first set of coefficients or with a second set of coefficients, wherein the first set of coefficients and the second set of coefficients are stored in a memory. According to the system, the first set of coefficients is used on phase modulated input data and the second set of coefficients is used on input data that are not phase modulated.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing input data using a processor circuit, comprising:
   multiplying selectively a portion of the input data with a first set of coefficients or with a second set of coefficients based on a characteristic of the input data using a multiplication circuit, wherein the first set of coefficients and the second set of coefficients are stored in a memory and retrieved therefrom by the processing circuit for the multiplication,
   wherein the first set of coefficients is employed for multiplication when the input data are phase modulated, and
   wherein the second set of coefficients is employed for multiplication when the input data are not phase modulated.

2. The method according to claim 1, wherein the first set of coefficients and the second set of coefficients are determined in advance and stored in the memory prior to the method for processing input data being started.

3. The method according to claim 1, wherein the first set of coefficients comprises weighting coefficients multiplied with phase demodulation coefficients for a predetermined number of input data.

4. The method according to claim 1, wherein the second set of coefficients comprises weighting coefficients for a predetermined number of input data.

5. The method according to claim 1, wherein the input data comprise data samples received by a radar antenna.

6. The method according to claim 1, wherein the method further comprises:
   forwarding the result of the multiplication of a portion of the input data with either the first set of coefficients or the second set of coefficients to a FFT processing stage.

7. The method according to claim 1, wherein the input data are processed in portions of a predetermined size and wherein the method further comprises:
   multiplying each portion of the predetermined size of the input data either with the first set of coefficients or with the second set of coefficients based on a predefined pattern ascertained by the processing circuit.

8. The method according to claim 7, wherein the predefined pattern is provided to the processing circuit via a shift register.

9. The method according to claim 1, wherein the input data are processed in portions of a predetermined size and wherein the multiplying further comprises:
   multiplying each portion of the predetermined size of the input data with the first set of coefficients using the multiplication circuit;
   multiplying each portion of the predetermined size of the input data with the second set of coefficients using the multiplication circuit;
   determining whether the first set of coefficients or the second set of coefficients provides a better result of the multiplication using the processing circuit; and
   forwarding the result of the multiplication which provided better results based on the determination by the processing circuit to a FFT processing stage.

10. The method according to claim 9, wherein the determining comprises:
    determining whether the first set of coefficients or the second set of coefficients provides a better results based on a noise level using the processing circuit.

11. A device for processing radar signals comprising:
    a processing unit; and
    a memory configured to store a first set of coefficients and a second set of coefficients that are different from one another,
    wherein the processing unit is configured to:
       receive input data and access the memory to selectively multiply a portion of the input data with the first set of coefficients or with the second set of coefficients based on a characteristic of the input data,
       wherein the first set of coefficients is used for multiplication when the input data is phase modulated, and
       wherein the second set of coefficients is used for multiplication when the input data are not phase modulated.

12. The device according to claim 11, further comprising a FFT processing stage configured to further process the results of the multiplication.

13. The device according to claim 11, wherein the memory, the processing unit and the FFT processing stage are integrated on a single substrate.

14. The device according to claim 11, wherein the processing unit is further configured to multiply each portion of the predetermined size of the input data either with the first set of coefficients or with the second set of coefficients based on a predefined pattern.

15. The device according to claim 11, wherein the processing unit is further configured to:
    multiply each portion of the predetermined size of the input data with the first set of coefficients;
    multiply each portion of the predetermined size of the input data with the second set of coefficients;
    determine whether the first set of coefficients or the second set of coefficients provides the better results of the multiplication; and
    forward the result of the multiplication which provided better results to a FFT processing stage.

16. A radar transceiver module comprising the device according to claim 11.

17. A system for processing radar signals, comprising:
    memory means; and
    means for multiplying a portion of input data with a first set of coefficients or with a second set of coefficients, wherein the first set of coefficients and the second set of coefficients are stored in the memory means,
    wherein the first set of coefficients is used on phase modulated input data and
    wherein the second set of coefficients is used on input data that are not phase modulated.

* * * * *